(12) United States Patent
Bouton

(10) Patent No.: US 7,494,141 B2
(45) Date of Patent: Feb. 24, 2009

(54) TILTING FOUR WHEEL DRIVE VEHICLE

(76) Inventor: Todd Richard Bouton, 3742 Braemore Dr., Janesville, WI (US) 53548

( * ) Notice: Subject to any disclaimer, the term of this patent is extended or adjusted under 35 U.S.C. 154(b) by 288 days.

(21) Appl. No.: 11/070,884

(22) Filed: Mar. 2, 2005

(65) Prior Publication Data

US 2005/0206101 A1   Sep. 22, 2005

(51) Int. Cl.
*B60G 21/00* (2006.01)
(52) U.S. Cl. ............... 280/124.103; 180/22; 280/5.509; 280/5.52; 280/6.154
(58) Field of Classification Search .......... 280/124.103, 280/6.154, 5.509, 5.52; 180/22
See application file for complete search history.

(56) References Cited

U.S. PATENT DOCUMENTS 4,685,690 A * 8/1987 Fujita et al. ........... 280/124.103

* cited by examiner

*Primary Examiner*—Eric Culbreth

(57) ABSTRACT

In this vehicular chassis system, the vehicle's passenger compartment and wheels incline toward the turning center side in such a manner, that the wheels can be tilted independently from steering. This vehicle has a steering apparatus controlling the steering, and a separate apparatus controlling the lateral leaning. The lean is controlled mechanically using a pendulum, and forced lateral leaned using a control unit, or manually with the transfer of body weight using several pinions with a set ratio to control the passenger compartment lateral lean in conjunction with the wheel lateral lean.

An electric DC servo gear motor can be used to control the lateral lean, that in turn moves a pinion, which moves a rack and lateral movable cross member, while controlling the lateral leaning wheels and pulling the tilt support bar pivotally attached to a passenger compartment in the same leaning direction.

3 Claims, 15 Drawing Sheets

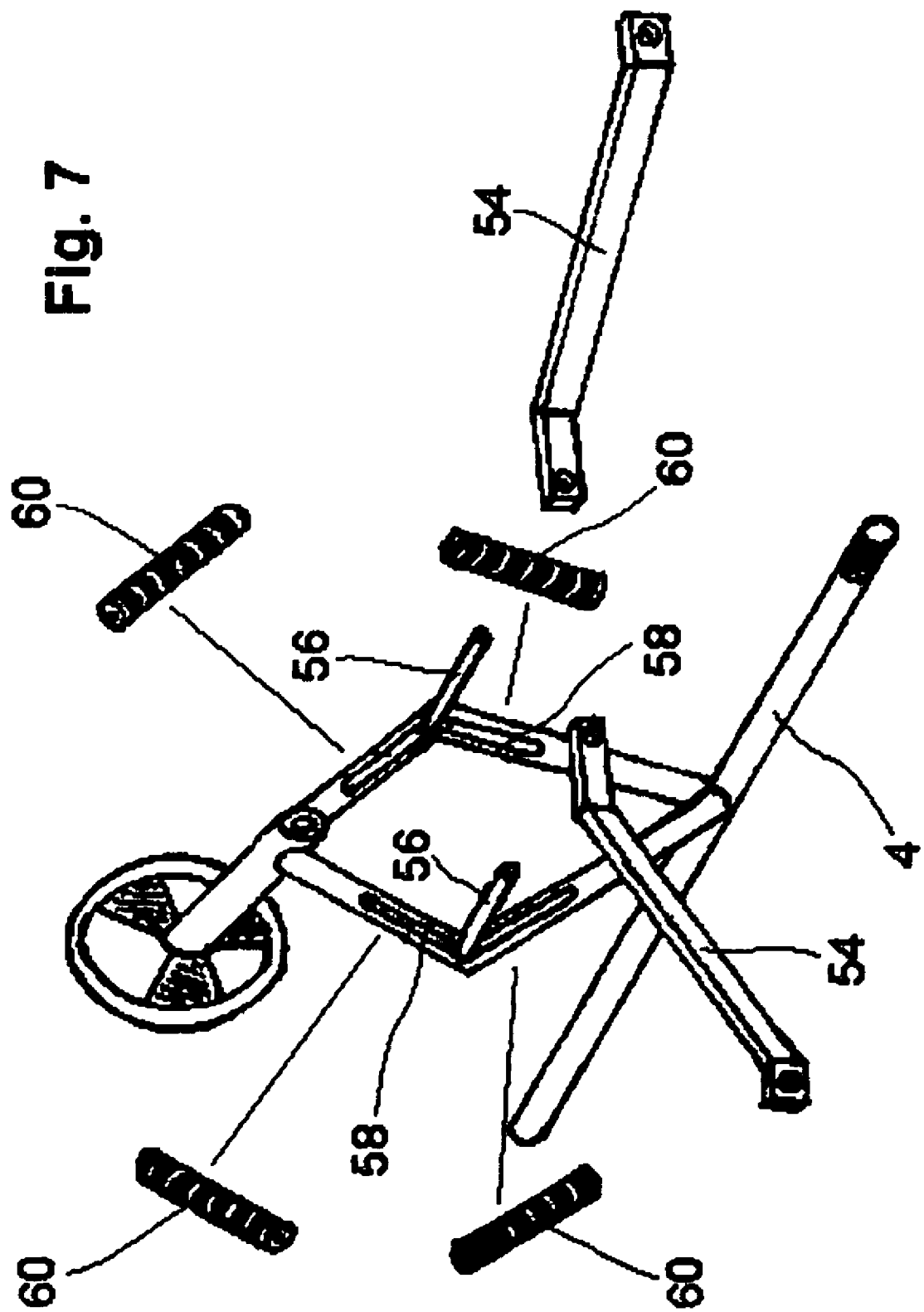

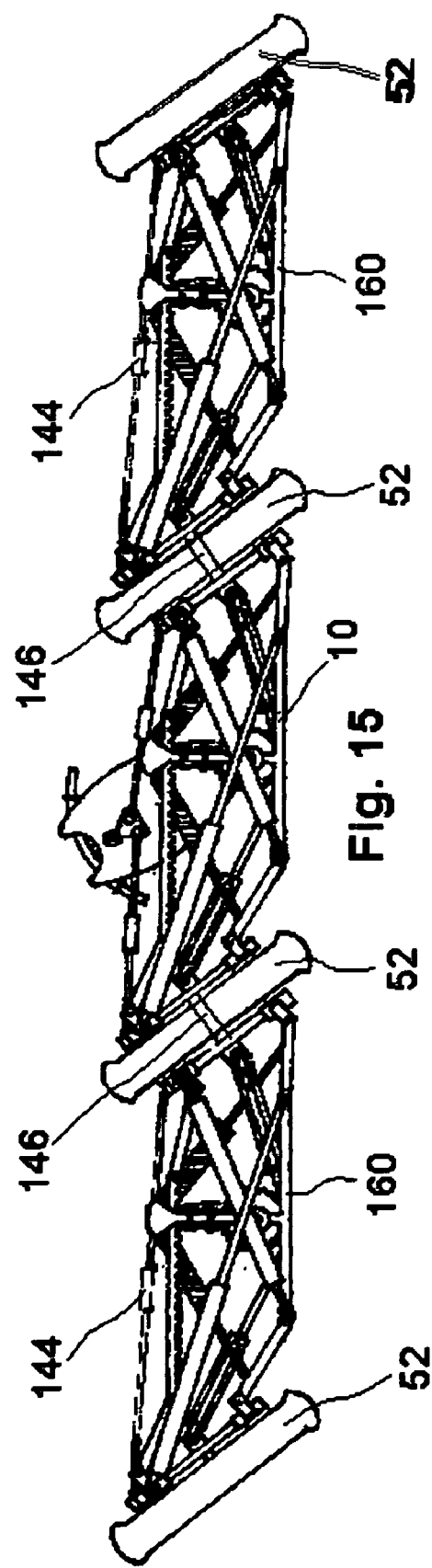
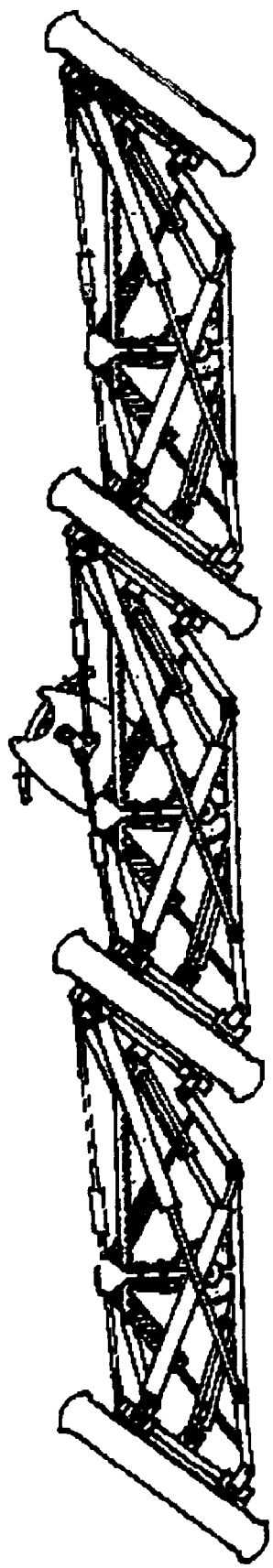

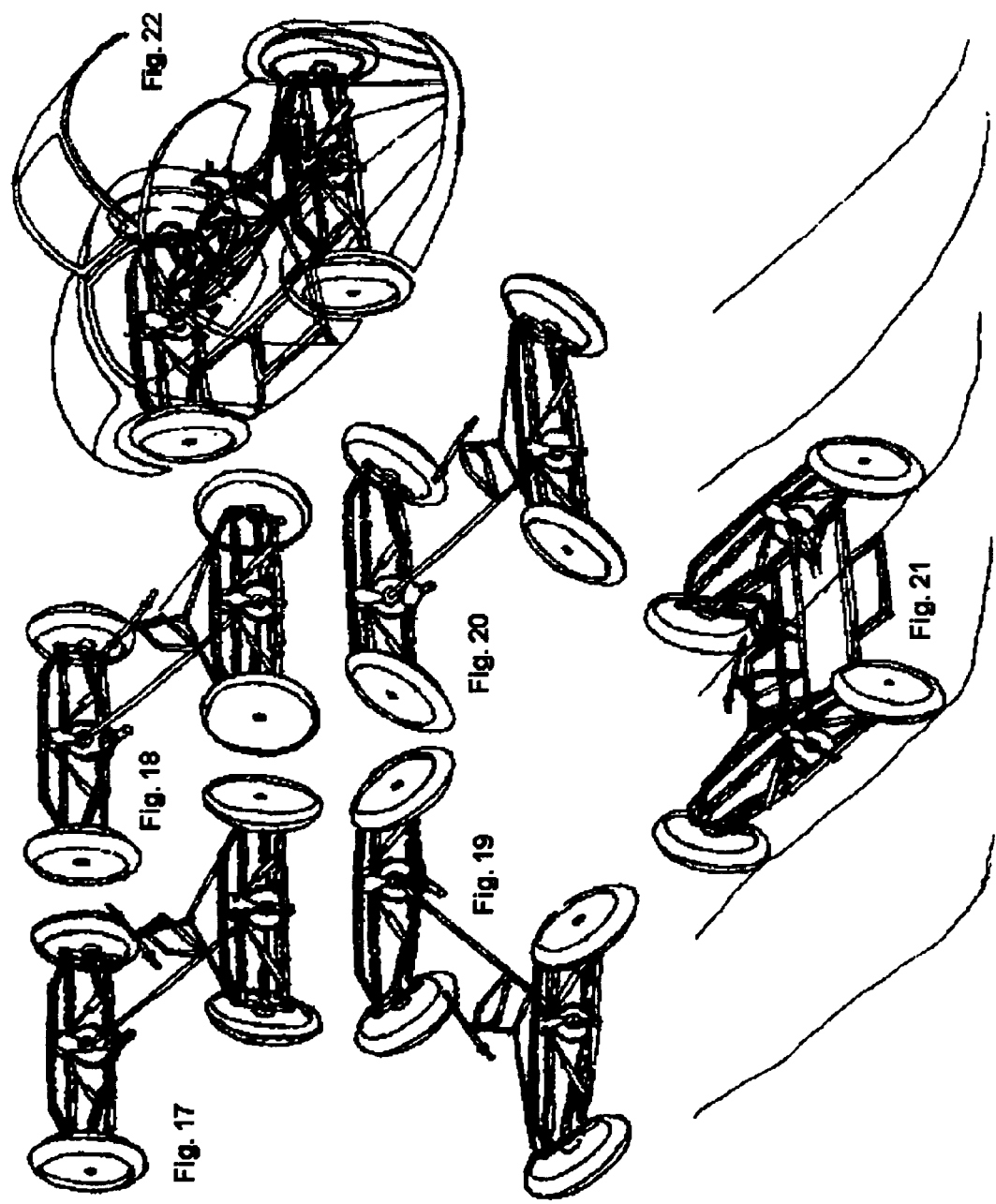

TILTING FOUR WHEEL DRIVE VEHICLE

BRIEF SUMMARY AND OBJECT OF THE INVENTION

The invention seeks to realize among other things the following:

The object of the invention is to provide a novel driving mechanism that combines driving capabilities with lateral leaning capabilities in a turn, or transversing hill.

A principle object of the present invention is to have several designs to limit its lateral lean for safety purpose or increase the lateral lean for maximum capability.

A change of component and assembly part sizes, and its capable of a driving lean angle of 50+ degrees from the central plane.

A further important object of the present invention is to provide a steering mechanism that is independent of the lateral leaning mechanism.

Another major object of the invention is to provide a lateral leaning mechanism that is controlled manually by the transfer of weight about various points on a pivot shaft, a passenger compartment laterally leaning in response to the transfer of human weight, may be balanced to level with springs, struts, or leaf springs.

Another principle object is to provide a tilting mechanism that leans the passenger compartment with a machine, known in the art as hydraulics, DC servo gear motor, or a simple power steering pump.

Yet another principle object is to provide a lateral leaning mechanism that leans the front and back suspensions independently of one another with a front and back pendulum hanging from a front and back control box, allowing each suspensions to control it's own lateral lean.

A front and back pendulum having a front and back mechanical control box each having a rubber mount around the respective front and back pendulum shaft giving enough tension to maintain a comfortable independent lateral lean for a front and back suspension frame while transversing on a hill side, reducing the hard, or fast lateral lean of a passenger compartment.

Yet another object of the present invention is to provide a high performance vehicle that allows safer turns at higher speeds due to an increased turning capability there of the tilting passenger compartment and wheels.

Still another object of the present invention is to provide a body and frame that stays level with the central plane while the passenger compartment and wheels lean into a turn or tilt on a hill.

It is a further object of the invention to provide a tilt wheel and passenger compartment capability for off road vehicles, construction equipment, moon rover vehicles, or mowing machines.

These and other objects and advantages of the invention will become more fully apparent from the description of the views and the detailed embodiments that follow, or may be learned by the practice of the invention.

BRIEF DESCRIPTION OF THE DRAWINGS

FIG. 7: Is a front, right side, and top, isometric view of a passenger steering assembly in an up right position, showing an left and right tilt support and leveling springs unassembled.

FIG. 15: Is a front view of a motor cycle passenger compartment and wheels laterally leaning right, having a right and left unmanned suspension frame mounted with dual axles to a center suspension frame passenger point of view.

FIG. 16: Is a front view of a motor cycle passenger compartment and wheels laterally leaning left, having a right and left unmanned suspension frame mounted with dual axles to a center suspension frame passengers point of view.

FIG. 17: Is a front, top and right side, isometric view of vehicle steering right into turn, passengers point of view.

FIG. 18: Is a front, top and right side, isometric view of vehicle steering left into turn, passengers point of view.

FIG. 19: Is a front, top and left side, isometric view of vehicle laterally leaning right into turn, passengers point of view.

FIG. 20: Is a front, top and right side, isometric view of vehicle laterally leaning left into turn, passengers point of view.

FIG. 21: Is a front, top, and left side, isometric view showing both suspensions in conjunction with each other transversing a hillside.

FIG. 22: Is a front, top, and right side, isometric view of a four wheel drive stationary car body, with a motor cycle passenger compartment, in a normal up right position driving straightforward.

DETAILED DESCRIPTION OF THE EMBODIMENTS

Mechanical controlled lateral leaning suspension number 1:

These embodiments referring now to the accompanying drawings.

Figure 2:
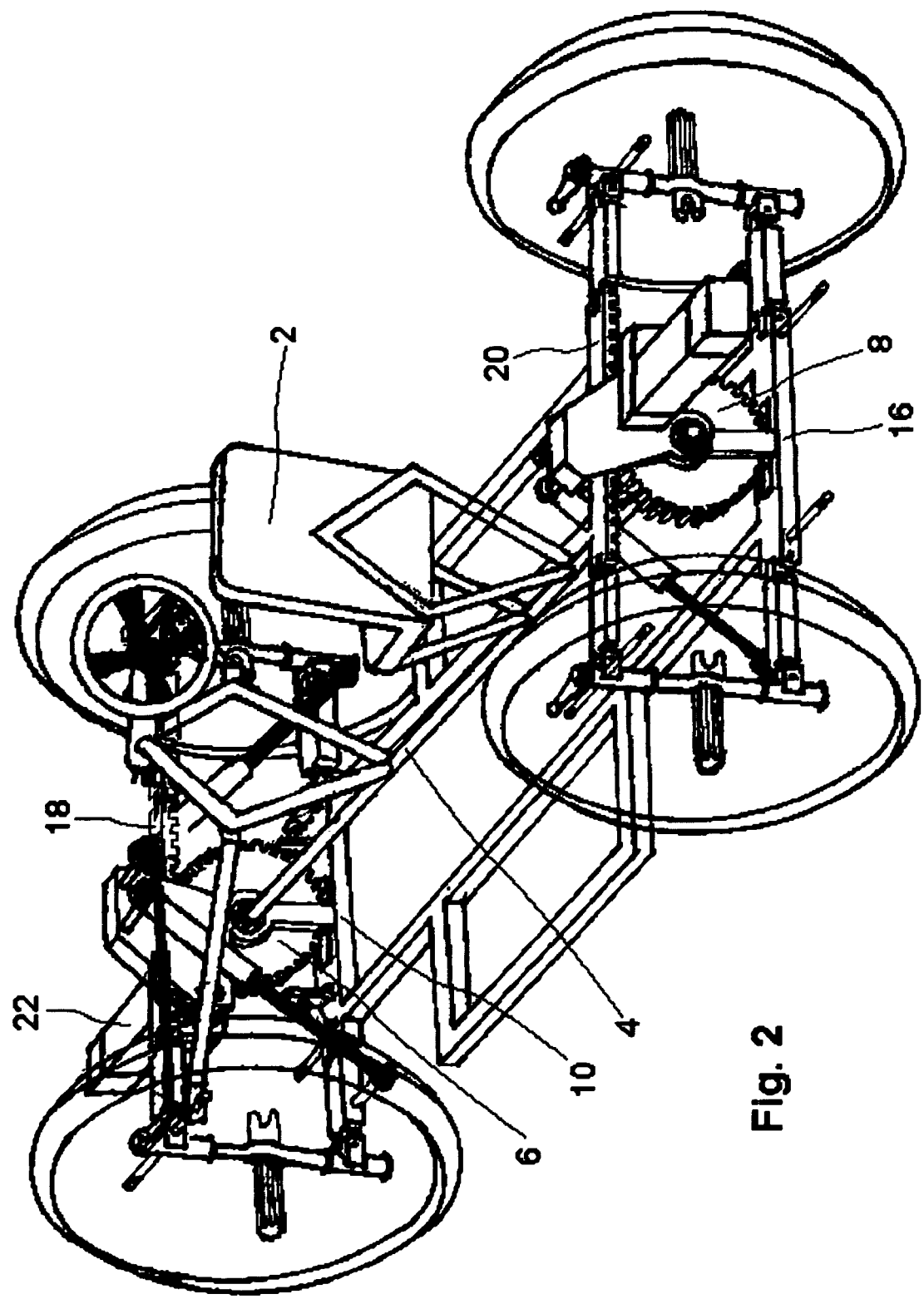
FIG. 2: Is a back, left side, and top, isometric view of a forced mechanical tilting suspension having a mechanism controlled tilt, showing the front and back electric DC servo motors.

FIG. 2 A four wheel drive vehicle with mechanical controlled wheel and passenger compartment lateral tilt having an elongated passenger compartment on a tilt shaft from front to back, and independent steering.

A tilt shaft 4 with a fixed mount to a passenger compartment 2, each end of the respective tilt shaft having a pivot mount to a front and back tilt shaft pinion 6,8 on a mechanical lateral leaning suspension for a mechanism controlled lateral lean.

A tilt shaft pinion 6 rotatively mounted on a front suspension frame 10 for rotation about a transverse axis from a tilt shaft 4.

Figure 12:
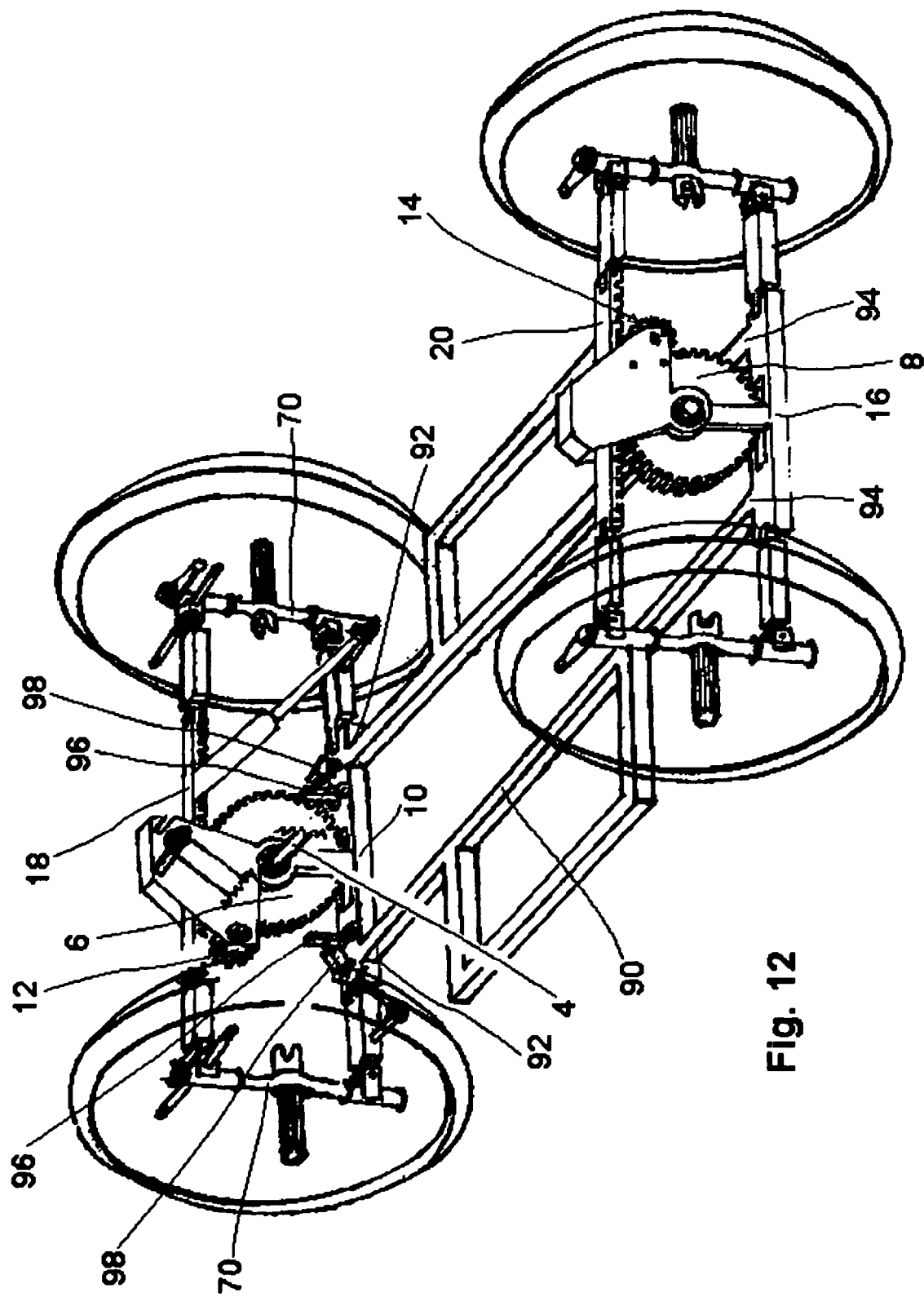
FIG. 12: Is a back, left side, and top, isometric view of a tilting suspension and chassis mostly unassembled, showing tilt shaft pinions locking mechanisms.

FIG. 12 A front and back motor pinion 12, 14 rotatively mounted on a front and back suspension frame 10, 16 in a generally ten o'clock position transversely from each end of a tilt shaft 4 in a gear mesh relationship with the respective front and back tilt shaft pinion 6, 8, controlling a front lateral movable cross member 18, in conjunction with a back lateral movable cross member 20, using a forced mechanism for lateral lean control.

Figure 4:
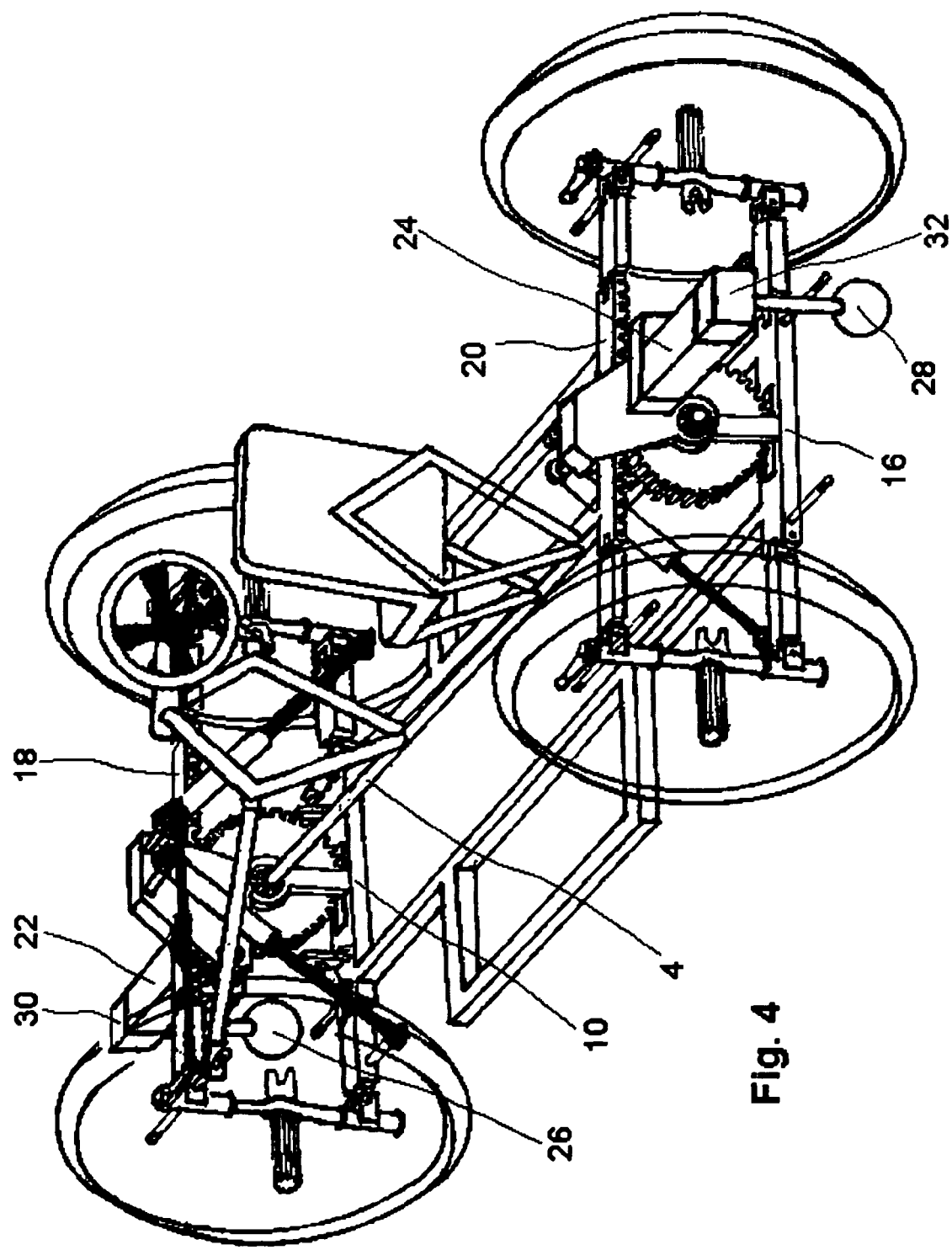
FIG. 4: Is a back, left side, and top, isometric view of a mechanical tilting suspension having a front and back pendulum hanging from a front and back mechanical control box controlling the front and back suspension independently from each other.

FIG. 4 A front and back electric DC servo gear motor 22, 24 having a fixed mount to a front and back suspension frame 10, 16 and controlled in conjunction with each other using a passenger forced mechanical control unit.

Below is an independently controlled front and back lateral leaning suspension:

FIG. 12 A front and back motor pinion 12, 14 rotatively mounted on a front and back suspension frame 10, 16 in a generally ten o'clock position transversely from each end of a tilt shaft 4 in a gear mesh relationship with the respective front and back tilt shaft pinion 6, 8 controlling a front lateral movable cross member 18, independently from a back lateral movable cross member 20, using individual mechanisms for mechanical lateral lean control.

FIG. 4 A front and back electric DC servo gear motor 22, 24 having a fixed mount to a front and back suspension frame 10, 16, controlled with a front and back pendulum 26,28 using a front and back mechanical control box 30, 32, working independently hanging from the respective front and back mechanical control box 30, 32 mounted directly to the back of a front and back electric DC servo gear motor 22, 24 controlling a front lateral movable cross member 18 independently from a back lateral movable cross member 20.

Figure 5:
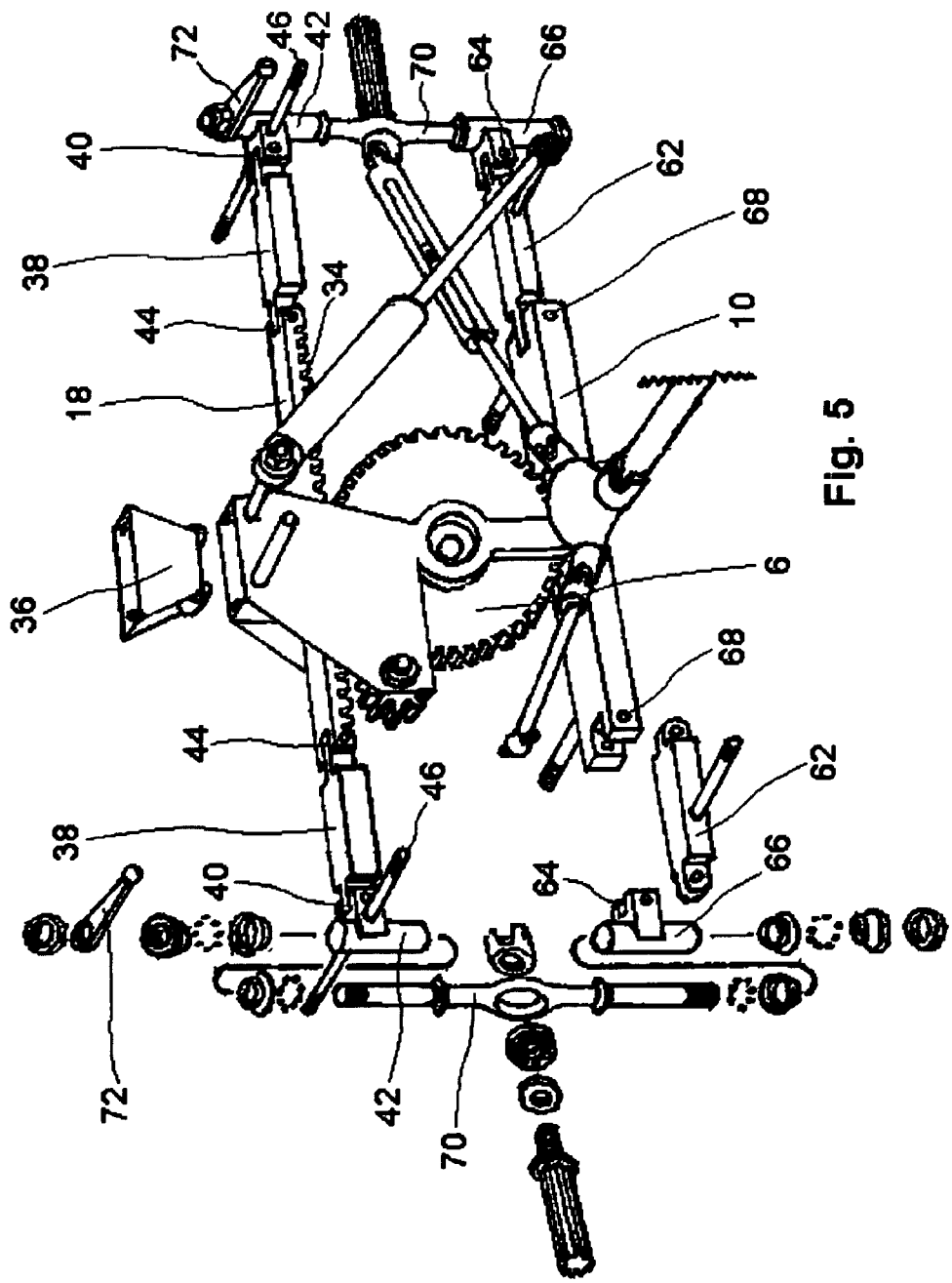
FIG. 5: Is a back, left side, and top, isometric view having the right half of a suspension mostly assembled, and the left half mostly unassembled to show the construction and component details.

FIG. 5 A lateral movable cross member and rack combined 18, 34 in a gear mesh relationship on the top of a tilt shaft pinion 6.

A roller bearing guide 36 having a fixed mount to the top of a suspension frame 10 with a roller bearing relationship to the top of the respective lateral movable cross member 18 for locating and aligning on the top of the respective tilt shaft pinion 6.

An upper control arm 38 having a upper attachment point 44, in an articulated fashion to the outer ends of a lateral movable cross member 18, maintaining a generally fixed distance between the respective right and left upper control arm 38.

An upper tubular joint 42, having a upper attachment point 40 mounted in an articulated fashion to the outer ends of a upper control arm 38, maintaining a a generally fixed distance between the respective right and left upper tubular joint 42.

A king pin 46 having a fixed mount on a upper tubular joint 42 transversely from a lateral movable cross member 18 with the outer end of the respective king pin 46 pointing to the back of the vehicle.

Figure 6:
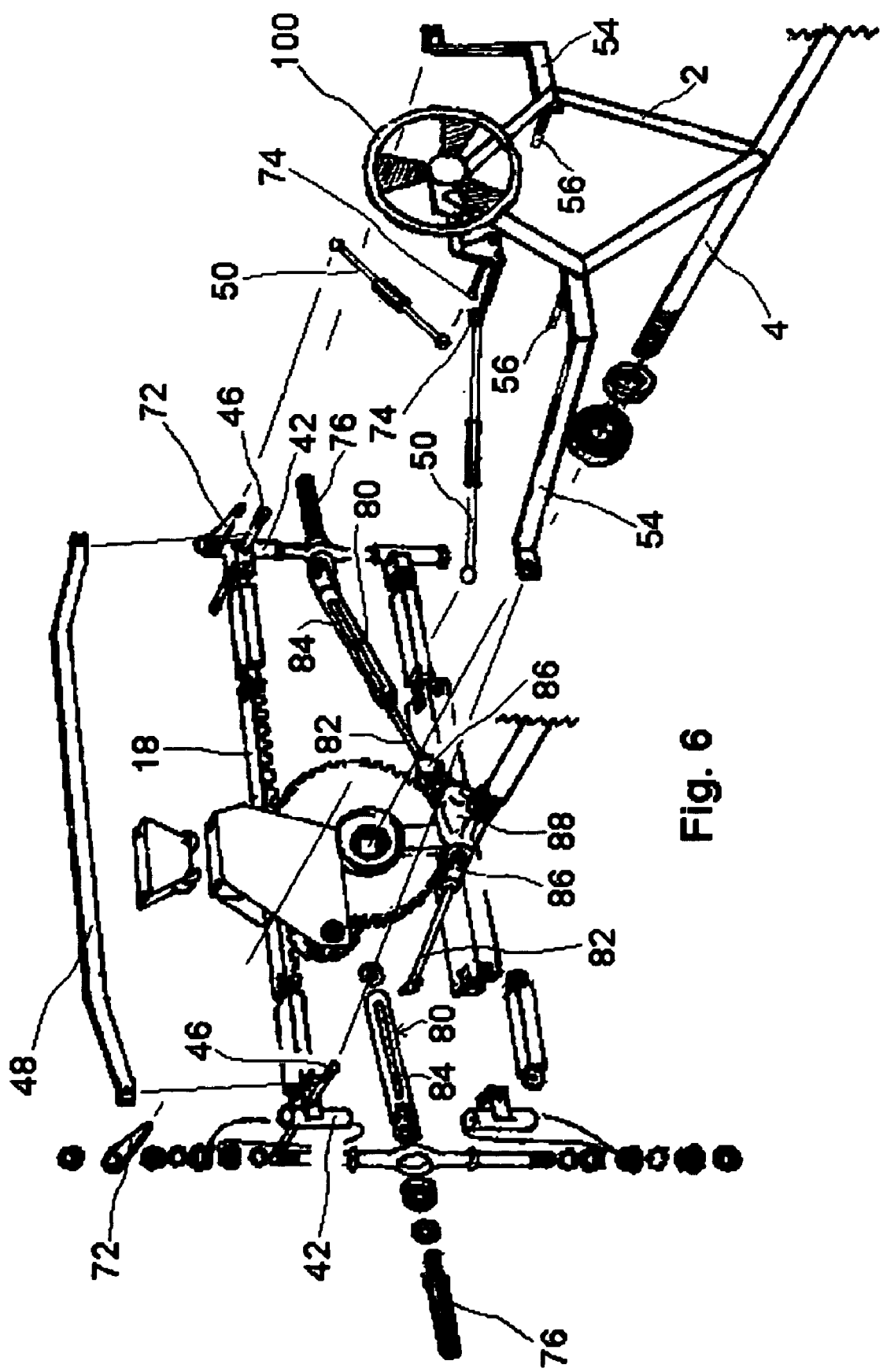
FIG. 6: Is a back, left side, and top, isometric view having the right half of a suspension mostly assembled, and the left half mostly unassembled with a front view of a passenger steering assembly inline unassembled from suspension and also showing a steering support bar inline, above suspension unassembled.

FIG. 6 A steering support bar 48 (shown unassembled above suspension) having a pivot hole at each end to be pivotally mounted to a king pin 46, maintaining a transverse axis from a tilt shaft 4.

Figure 8:
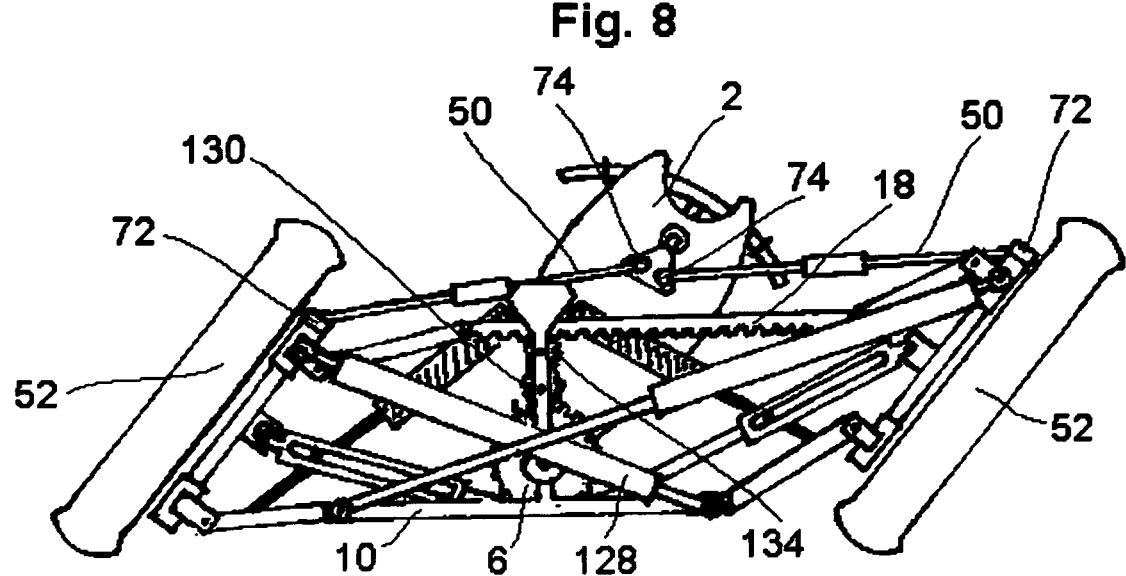
FIG. 8: Is a front view of a motor cycle passenger compartment and wheels laterally leaning right, from it's passengers point of view, showing a left strut countering out the opposing right tilt of lower suspension frame.

An upper tubular joint 42 having a king pin 46 for a steering support bar 48, pivotally mounted to maintain a steering rod 50 alignment, allowing full lateral lean of a right and left wheel 52 and passenger compartment 2 (shown in FIG.8).

FIG. 6 A tilt support bar 54 having a pivot hole at each end to be pivotally mounted to the respective king pin 46, maintaining a generally transverse axis from a tilt shaft 4.

A tilt support bar 54 pivotally mounted on the respective king pin 46 having the inner end of the respective tilt support bar 54 pivotally mounted to a passenger compartment king pin 56 for lateral lean control of a passenger compartment 2.

Figure 1:
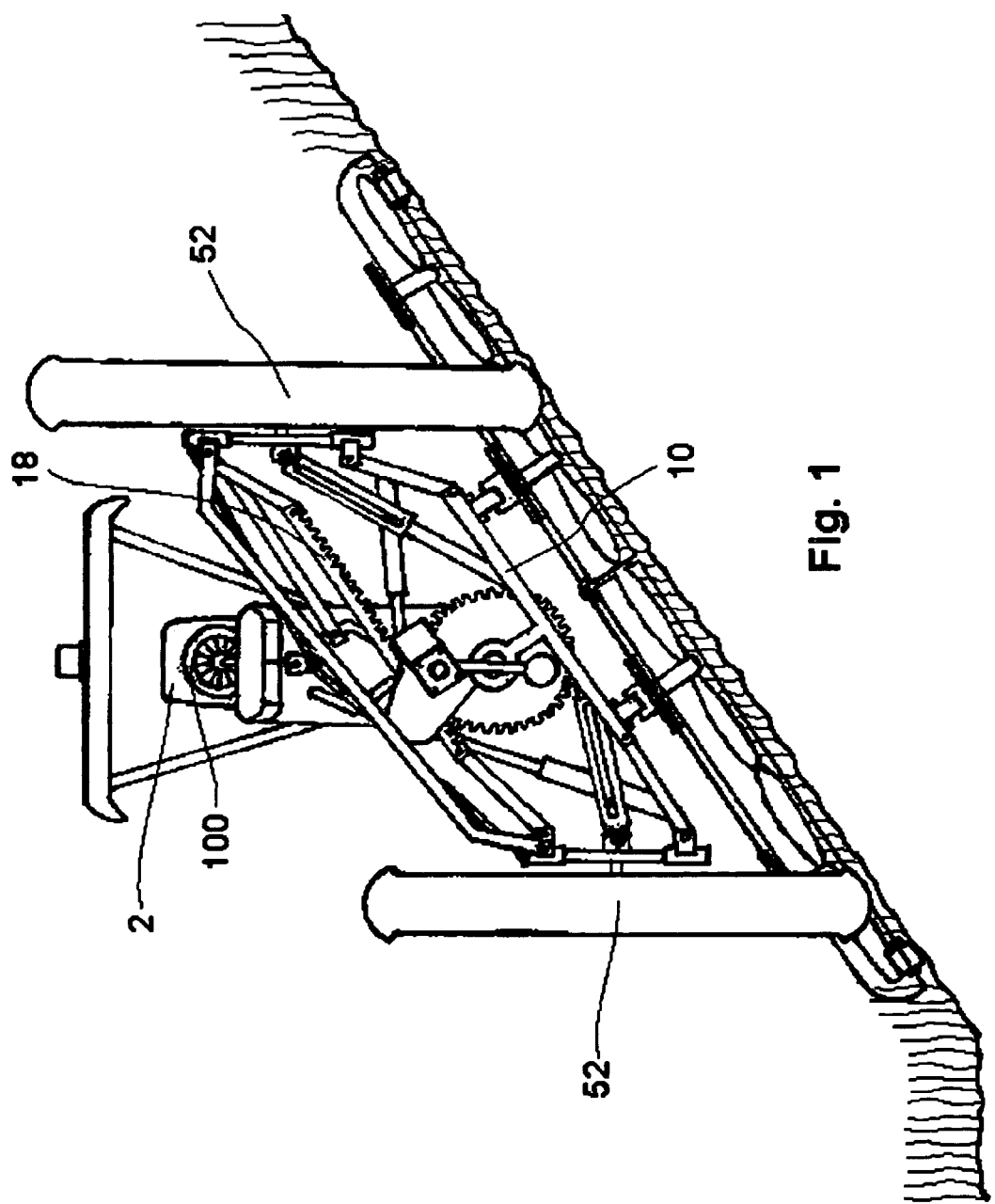
FIG. 1: Is a front view of a tractor suspension in a left lateral tilt from it's passengers point of view while transversing a hill side.

FIG. 7 A slot mount 58 on a passenger compartment, for a passenger compartment king pin 56, with leveling springs 60 (shown unassembled) mounted inside the respective slot mount 58 centering the respective passenger compartment king pin 56 and assisting the lateral movable cross member 18 back to a center position on the suspension frame 10 (shown in FIG.1).

FIG. 7 A passenger compartment king pin 56 slot mounted on the front of a passenger compartment 2, (shown in FIG.6) having the outer end of the respective passenger compartment king pin 56, pointing to the front of the vehicle with the same front to back axis as a tilt shaft 4 to accept a pivot hole on the inner end of a tilt support bar 54.

FIG. 5 A lower control arm 62 having a lower attachment point 68 mounted in an articulated fashion to the outer end of a lower suspension frame 10, maintaining a generally fixed distance between the respective right and left lower control arm 62.

A lower tubular joint 66 having a lower attachment point 64 mounted in an articulated fashion to the outer end of a lower control arm 62, maintaining a generally fixed distance between the respective right and left lower tubular joint 66.

An upper and lower tubular joint 42, 66, each having a vertical pivot mount for a spindle 70, allowing independent steering from the tilt with a steering knuckle 72 fixed mounted to the top of the respective spindle 70.

A steering knuckle 72 having a fixed mount on the top of a spindle 70 in a generally transverse axis from a lateral movable cross member 18 with the outer end of the respective steering knuckle 72 pointing to the back of the vehicle allowing independent steering from the lateral lean.

FIG. 6 A steering knuckle 72 having a pivotal ball joint mount to a steering rod 50, and pivotally mounted at the opposite inner end of the respective steering rod 50, is a ball joint 74 fixed mounted on a pitman arm, forced controlled independently from the lateral lean, with a passenger compartment steering wheel 100.

A ball joint 74 fixed mounted to a pitman arm having a transverse axis from a lateral movable cross member 18, with the outer end of the respective ball joint 74 pointing to the front of the vehicle.

FIG. 5 A spindle 70 having a vertical axis with a pivot mount to a upper and lower tubular joint 42, 66.

Figure 9:
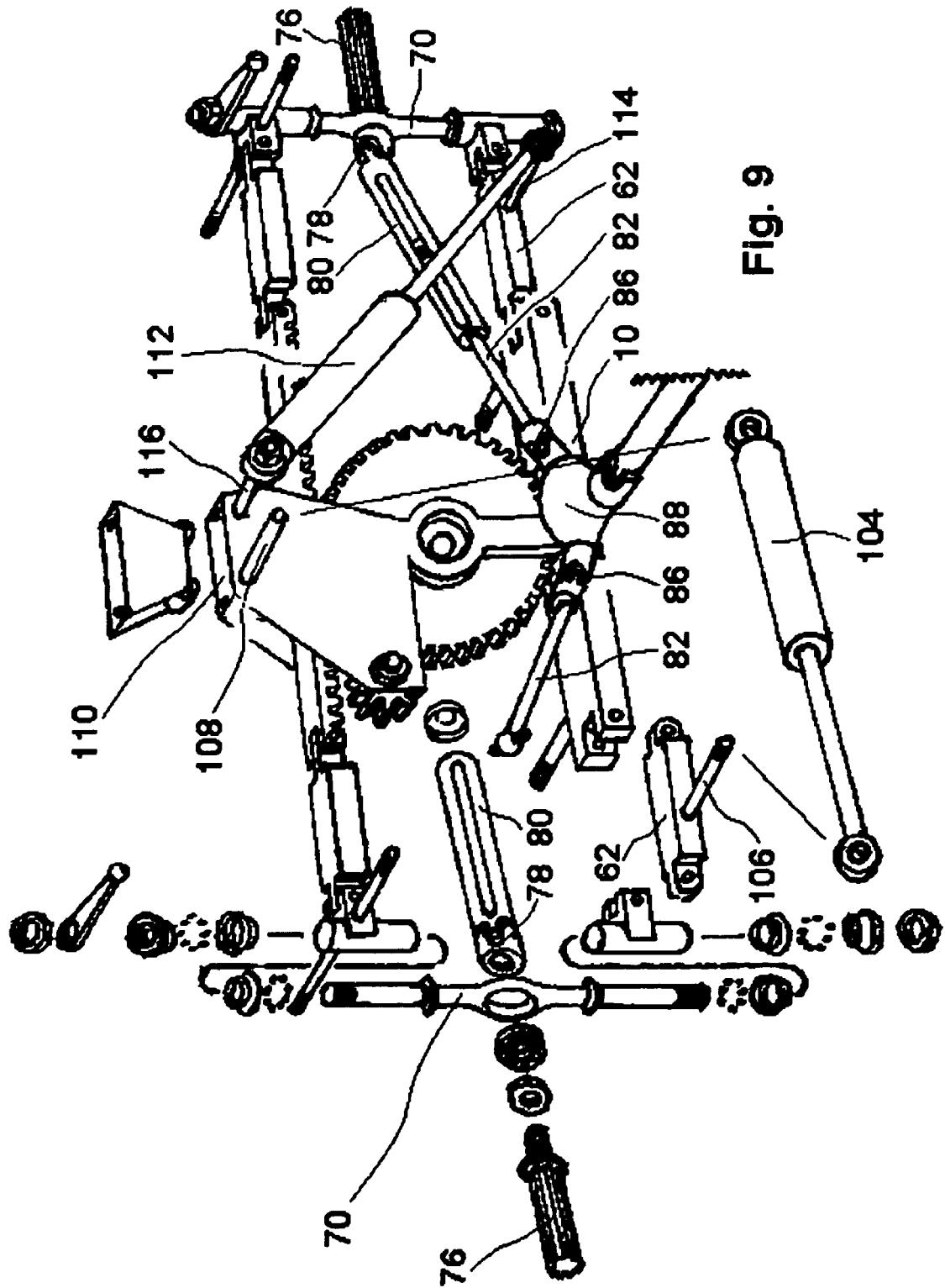
FIG. 9: Is a back, left side, and top, isometric view having the right half of a suspension mostly assembled, and the left half mostly unassembled to show the construction and component details.

FIG. 9 An axle 76 having a horizontal axis with a rotatable mount therethrough the center of a spindle 70.

FIG. 6 An axle 76 having a generally transverse axis from a tilt shaft 4 passing therethrough the center of a spindle 70, (shown in FIG. 9) with a fixed mount to a universal joint 78, located on the outer end of a CV slide shaft 80.

A CV slide shaft 80, universally mounted to a axle 76 with a rotatable mount therethrough the center of a spindle 70, (shown in FIG.6) a generally transverse axis from a tilt shaft 4.

Figure 10:
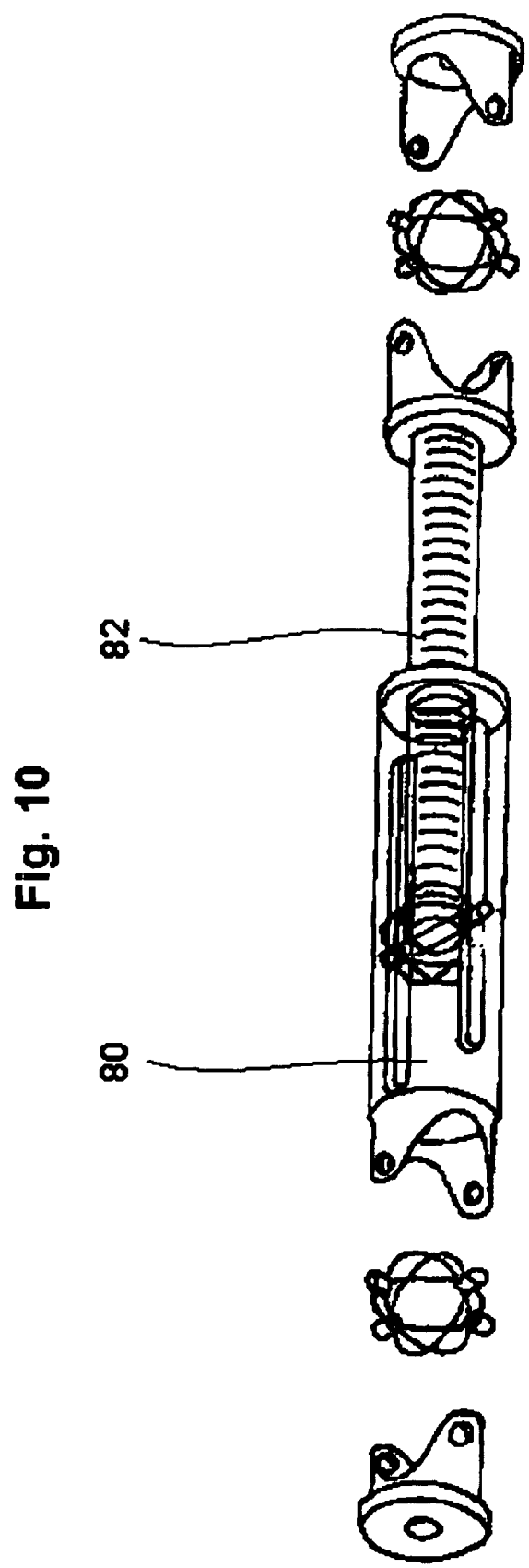
FIG. 10: Is a front, top and left side, isometric view of a CV slide shaft and dog bone shown mostly unassembled at there universal attachment points.

FIG. 10 A CV slide shaft 80 having a passage on the inner end for receiving a telescopically mounted outer end of a dog bone shaft 82.

FIG. 6 A dog bone shaft 82 having a generally transverse axis from a tilt shaft 4 with two slot pins fixed mounted on the outer end of the respective dog bone shaft 82 for receiving a telescopic slot mount 84 on the inner end of a CV slide shaft 80, allowing full lateral lean of a right and left wheel 52, and passenger compartment 2. (shown in FIG.1).

FIG. 6 A dog bone shaft 82, with a universal mount 86 to a differential 88 having a generally transverse axis from a tilt shaft 4.

FIG. 9 A differential 88 could have a limited pivot mount to a lower suspension frame 10 to stay in line with a universal mount 86 located on the inner end of a dog bone shaft 82, allowing full lateral lean of a right and left wheel 52, and passenger compartment 2. (shown in FIG.1).

Figure 11:
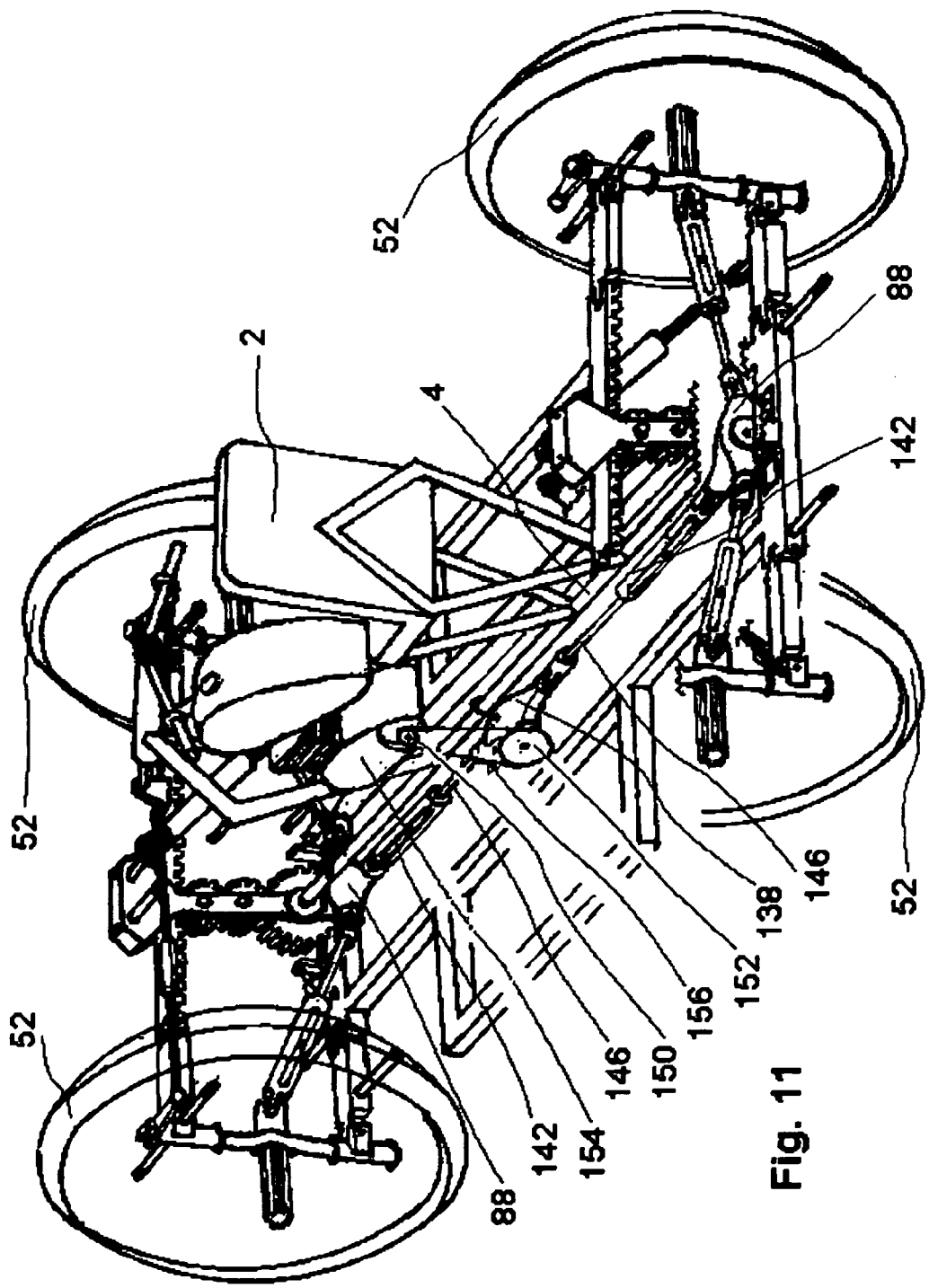
FIG. 11: Is a back, left side, and top, isometric view of a manual tilting suspension showing an internal combustion motor and its four wheel drive train assembled.

FIG. 11 An internal combustion motor 154 having a fixed mount to a passenger compartment 2 to drive all four wheels 52 of this vehicle, using a motor drive sprocket 150 with a roller drive chain 156.

A lower differential sprocket 152 having a fixed mount to the center drive joint of the respective middle differential 138, with a roller chain relationship to a roller drive chain 156.

A middle differential 138 having a fixed mount to the bottom of a tilt shaft 4, generally centered from the front and back of the vehicle in a transverse axis from a front and back differential 88.

A front and back drive dog bone shaft 146 having a universal mount to a front and back of a middle differential 138, with a generally same axis as the tilt shaft 4.

A CV drive slide shaft 142, having a passage on the inner end for receiving a telescopically mounted outer end of a drive dog bone shaft 146, with a generally same axis as the tilt shaft 4.

A front and back differential 88 having a universal drive mount to the outer end of the respective CV drive slide shaft 142.

FIG. 15 A plurality of suspensions assemble together side by side with a dual axle 146, and each unmanned suspension frame 160 having a single steering rod 144 to maintain alignment between sets of wheels 52.

FIG. 12 A central chassis system 90 elongated from front to back with a front fixed mount 92 to a front lower suspension frame 10, maintaining alignment for a tilt shaft 4 and a front tilt shaft pinion 6.

FIG. 12 A central chassis system 90 elongated from front to back with a back fixed mount 94 to a back lower suspension frame 16, maintaining alignment for a tilt shaft 4 and a back tilt shaft pinion 8.

FIG. 12 A right and left pinion locking device manually activated in the form of a ratchet pawl 96 hinged mounted on a suspension frame 10 in a generally parallel axis to a spindle 70, each respective right and left ratchet pawl 96 can be forced engaged at the same time into both sides of the tilt shaft pinion 6 cogs.

Figure 3:
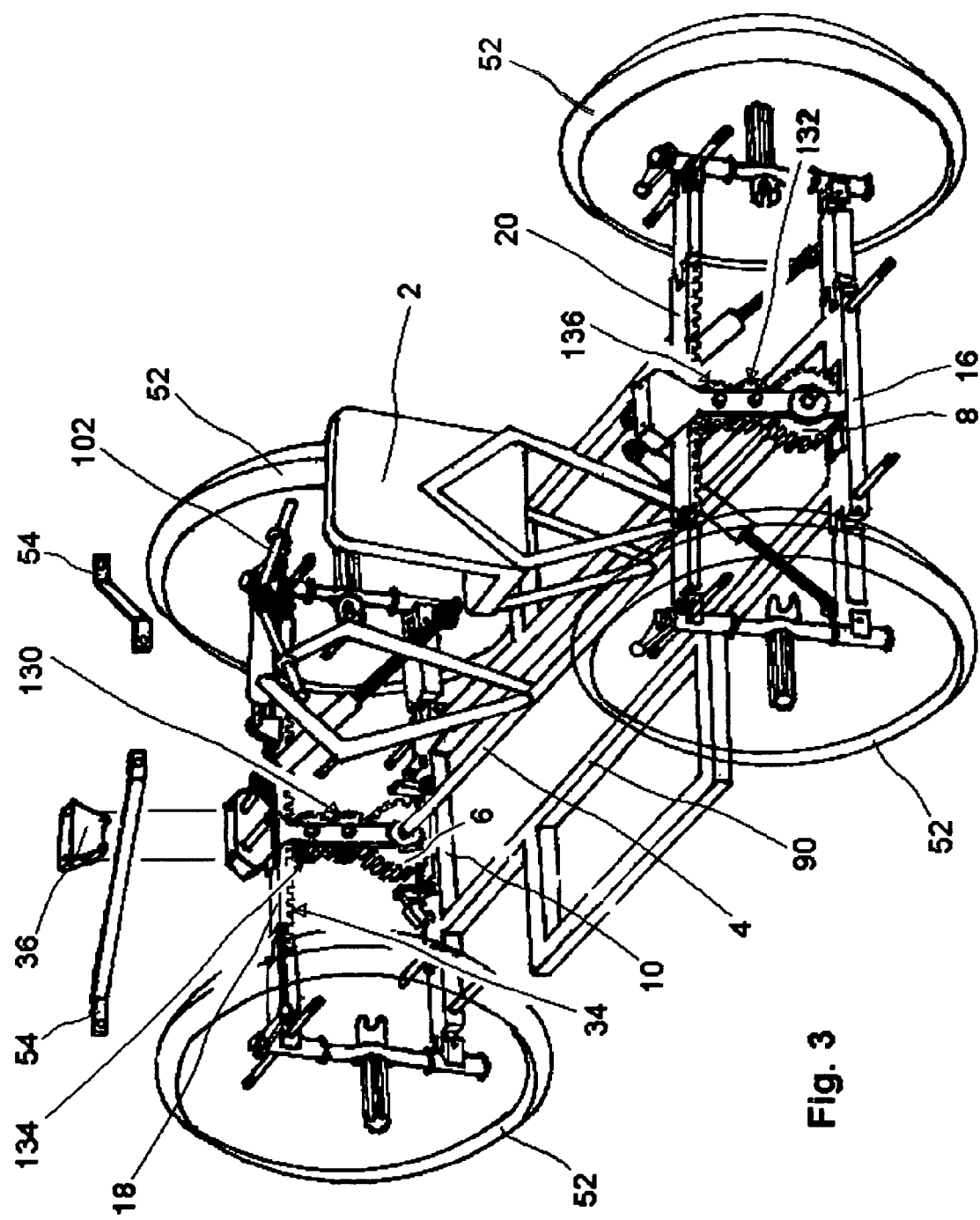
FIG. 3: Is a back, left side, and top, isometric view of a manual tilting suspension capable controlling the lateral tilt, with the transferring of a humans body weight shifting side to side, showing an optional right and left tilt support bar and a guide unassembled.

A electro magnetic switch 98 in position to mechanically engage a ratchet pawl 96, into a segment of the respective tilt shaft pinion 6 cogs, to lock the tilted vehicle in a lateral lean position maintaining complete control of the vehicle in a turn with independent steering, using a car steering wheel 100, (shown in FIG. 1) or a motor cycle type handle bar 102(shown in FIG. 3).

FIG. 9 A left strut assembly 104 operatively attached on a left lower control arm 62 with a left lower strut attachment point 106, and at the top of a suspension frame 10 having a left upper strut attachment point 108 just left of center of a cross member positioning means 110.

A right strut assembly 112 operatively attached on a right lower control arm 62 with a right lower strut attachment point 114, and at the top of a suspension frame 10 having a right upper strut attachment point 116 just right of center of a cross member positioning means 110.

Figure 13:
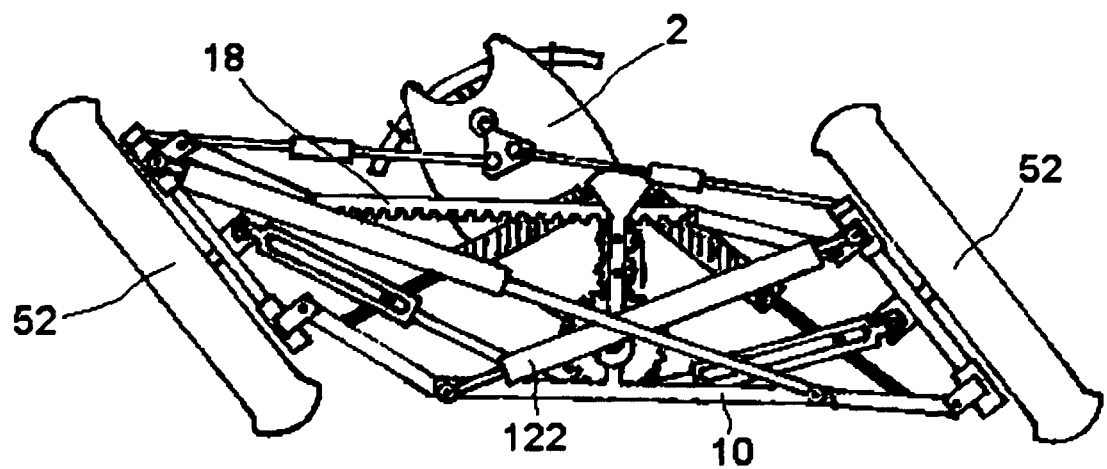
FIG. 13: Is a front view of a motor cycle passenger compartment and wheels laterally leaning left, from it's passengers point of view, showing a left strut countering out the opposing left tilt of lower suspension frame.

FIG. 13 Countering out the opposing tilt on a lower suspension frame 10 generated from the lateral movement left from a lateral movable cross member 18.

FIG. 3 A suspension frame 10 and chassis 90 that stays generally parallel to the ground when transversing a hillside.

Figure 14:
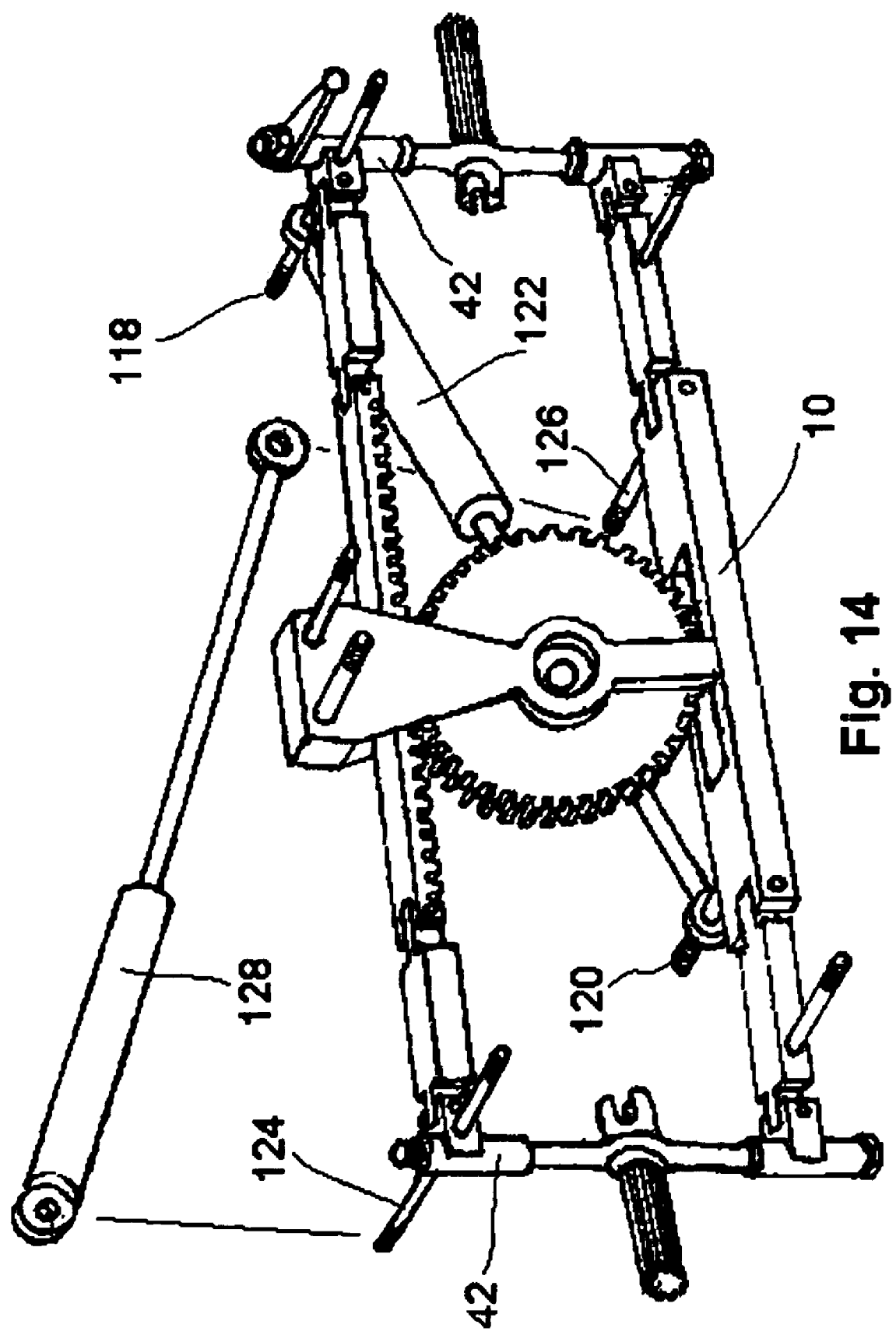
FIG. 14: Is a back, left side, and top, isometric view having a right counter strut assembled, and a left counter strut unassembled, passengers point of view.

FIG. 14 A right upper counter strut king pin 118 fixed mounted on the top of a right upper tubular joint 42.

A left lower counter strut king pin 120 fixed mounted on the bottom of a suspension frame 10.

A right strut 122 pivotally mounted from the respective right upper counter strut king pin 118 to the respective left lower counter strut king pin 120.

FIG. 13 A lateral movable cross member 18 moves laterally to the left forcing the respective right strut 122 to generally counter out the opposing tilt of a lower suspension frame 10.

FIG. 8 Countering out the opposing tilt on a lower suspension frame 10 generated from the lateral movement right from the lateral movable cross member 18.

FIG. 14 A left upper counter strut king pin 124 fixed mounted on the top of a left upper tubular joint 42.

A right lower counter strut king pin 126 fixed mounted on the bottom of a suspension frame 10.

A left strut 128 pivotally mounted from the respective left upper counter strut king pin 124 to the respective right lower counter strut king pin 126.

FIG. 8 A lateral movable cross member 18 moves laterally to the right forcing the respective strut 128 to counter out the opposing tilt of a lower suspension frame 10.

Manual lateral leaning suspension number 2:

FIG. 3 A four wheel drive vehicle with manual controlled wheel and passenger compartment lateral lean having an elongated passenger compartment on a tilt shaft from front to back, and independent steering.

A tilt shaft 4 with a fixed mount to a passenger compartment 2, each end of the respective tilt shaft having a fixed mount to a front and back tilt shaft pinion 6, 8 on a manual lateral leaning suspension for human powered controlled lateral lean.

A tilt shaft pinion 6 rotatively mounted on a suspension frame 10 for rotation about a transverse axis from a tilt shaft 4.

A passenger compartment 2 fixed mounted to a tilt shaft 4, having a front and back tilt shaft pinion 6, 8 fixed mounted to each end of the respective tilt shaft 4, allowing a passenger to shift their body weight similar to a motor cycle or bicycle in a lateral leaning motion for manual lateral lean control of a right and left wheel 52, and a passenger compartment 2.

FIG. 12 A front and back motor pinion 12, 14 rotatively mounted on a front and back suspension frame 10, 16 in a generally ten o'clock position transversely from each end of a tilt shaft 4 in a gear mesh relationship with the respective front and back tilt shaft pinion 6, 8, controlling a front lateral movable cross member 18, conjunction with a back lateral movable cross member 20, using an optional forced mechanism for lateral lean control.

FIG. 3 A front and back middle pinion 130, 132 rotatively mounted on a front and back suspension frame 10, 16 in a gear mesh relationship on the top of the respective front and back tilt shaft pinion 6, 8, for rotation about a transverse axis from a tilt shaft 4.

A front and back top pinion 134, 136 rotatively mounted on a front and back suspension frame 10, 16 in a gear mesh relationship on the top of the respective front and back middle pinion 130, 132, for rotation about a transverse axis from a tilt shaft 4.

A lateral movable cross member and rack combined 18, 34 in a gear mesh relationship on the top of a top pinion 134.

A roller bearing guide 36 having a fixed mount to the top of a suspension frame 10 with a roller bearing relationship to the top of the respective lateral movable cross member 18 for locating and aligning on the top of the respective top pinion 134.

FIG. 5 An upper control arm 38 having a upper attachment point 44, mounted in an articulated fashion to the outer end of a right and left lateral movable cross member 18, maintaining a generally fixed distance between the respective right and left upper control arm 38.

An upper tubular joint 42, having an upper attachment point 40 mounted in an articulated fashion to the outer end of a right and left upper control arm 38, maintaining a generally fixed distance between the respective right and left upper tubular joint 42.

A king pin 46 having a fixed mount on a upper tubular joint 42 transversely from a lateral movable cross member 18, with the outer end of the respective king pin 46 pointing to the back of the vehicle.

FIG. 6 A steering support bar 48 (shown unassembled above suspension) having a pivot hole at each end to be pivotally mounted to a king pin 46, maintaining a transverse axis from a tilt shaft 4.

An upper tubular joint 42 having a king pin 46 for a steering support bar 48, pivotally mounted to maintain a steering rod 50 alignment, allowing full lateral lean of a right and left wheel 52 and passenger compartment 2 (shown in FIG. 8).

FIG. 3 A tilt support bar 54 is optional for support only on this manual lateral leaning suspension since the top pinion 134, middle pinion 130, and tilt shaft pinion 6 are timed out for lateral lean control for a passenger compartment 2, and a lateral movable cross member 18.

FIG. 6 A tilt support bar 54 having a pivot hole at each end to be pivotally mounted to the respective king pin 46, maintaining a generally transverse axis from a tilt shaft 4.

A tilt support bar 54 pivotally mounted on the respective king pin 46 having the inner end of the respective tilt support bar 54 pivotally mounted to a passenger compartment king pin 56 for back up support of a passenger compartment 2.

FIG. 7 A slot mount 58 on a passenger compartment, for an passenger compartment king pin 56, with leveling springs 60 (shown unassembled) mounted inside the respective slot mount 58 centering the respective passenger compartment king pin 56 and assisting the lateral movable cross member 18 back to a center position on the suspension frame 10 (shown in FIG. 1).

FIG. 3 A passenger compartment 2 controls the lateral lean of this manual lateral leaning suspension manually with a passenger shifting their body weight from side to side by pushing their feet against the chassis 90.

FIG. 1 A timing of a lateral leaning passenger compartment 2 to a lateral leaning right and left wheel 52, is only accomplished when FIG. 5 the lateral width of all the upper suspension components 18, 38, 42, and their attachment points 40, 44, of a manual lateral leaning suspension are set in a final width dimension, to establish in FIG. 3 a set ratio between the pinions 6, 130, 134 and rack 34.

FIG. 8 A ratio between tilt shaft pinion 6, middle pinion 130, and top pinion 134 diameters can be calculated to maintain a right and left steering rod 50 alignment, while keeping a fixed distance between a right and left ball joint 74 mounted on a pitman arm and a right and left steering knuckle 72, through out a full right and left lateral lean.

FIG. 5 A lower control arm 62 having a lower attachment point 68 mounted in an articulated fashion to the outer end of a right and left lower suspension frame 10, maintaining a fixed distance between the respective right and left lower control arm 62.

A lower tubular joint 66 having a lower attachment point 64 mounted in an articulated fashion to the outer end of a lower control arm 62, maintaining a generally fixed distance between the respective right and left lower tubular joint 66.

An upper and lower tubular joint 42, 66, each having a vertical pivot mount for a spindle 70, allowing independent steering from the lean with a steering knuckle 72 fixed mounted to the top of the respective spindle 70.

A steering knuckle 72 having a fixed mount on the top of a spindle 70 in a generally transverse axis from a lateral movable cross member 18, with the outer end of the respective steering knuckle 72 pointing to the back of the vehicle, allowing independent steering from the lateral lean.

FIG. 6 A steering knuckle 72 having a pivotal ball joint mount to a steering rod 50, and pivotally mounted at the opposite inner end of the respective steering rod 50, is a ball joint 74 fixed mounted on a pitman arm, forced controlled independently from the lateral lean, with a passenger compartment steering wheel 100.

A ball joint 74 fixed mounted to a pitman arm having a transverse axis from a lateral movable cross member 18 with the outer end of the respective ball joint 74 pointing to the front of the vehicle.

FIG. 5 A spindle 70 having a vertical axis with a pivot mount to a upper and lower tubular joint 42, 66.

FIG. 9 An axle 76 having a horizontal axis with a rotatable mount therethrough the center of a spindle 70.

FIG. 6 An axle 76 having a generally transverse axis from a tilt shaft 4 passing therethrough the center of a spindle 70, (shown in FIG 9) with a fixed mount to a universal joint 78, located on the outer end of a CV slide shaft 80.

A CV slide shaft 80, universally mounted to a axle 76 with a rotatable mount therethrough the center of a spindle 70, (shown in FIG. 6) in a generally transverse axis from a tilt shaft 4.

FIG. 10 A CV slide shaft 80 having a passage on the inner end for receiving a telescopically mounted outer end of a dog bone shaft 82.

FIG. 6 A dog bone shaft 82 having a generally transverse axis from a tilt shaft 4 with two slot pins fixed mounted on the outer end of a dog bone shaft 82 for receiving a telescopic slot mount 84 on the inner end of a CV slide shaft 80, allowing full lateral lean of a right and left wheel 52 and passenger compartment 2 (shown in FIG. 1).

FIG. 6 A dog bone shaft 82, with a universal mount 86 to a differential 88 having a generally transverse axis from a tilt shaft 4.

FIG. 9 A differential 88 could have a limited pivot mount to a lower suspension frame 10 to stay in line with a universal mount 86 located on the inner end of a dog bone shaft 82, FIG. 1 allowing full lateral lean of aright and left wheel 52, and passenger compartment 2(shown in FIG. 1).

FIG. 11 An internal combustion motor 154 having a fixed mount to a passenger compartment 2 to drive all four wheels 52 of this vehicle, using a motor drive sprocket 150 with a roller drive chain 156.

A middle differential 138 having a fixed mount to the bottom of a tilt shaft 4, generally centered from the front and back of the vehicle in a transverse axis from a front and back differential 88.

A lower differential sprocket 152 having a fixed mount to the center drive joint of the respective middle differential 138, with a roller chain relationship to a roller drive chain 156.

A front and back drive dog bone shaft 146 having a universal to a front and back of a middle differential 138, with a generally same axis as the tilt shaft 4.

A CV drive slide shaft 142, having a passage on the inner end for receiving a telescopically mounted outer end of a drive dog bone shaft 146, with a generally same axis as the tilt shaft 4.

A front and back differential 88 having a universal drive mount to the outer end of the respective CV drive slide shaft 142.

FIG. 15 A plurality of suspensions assemble together side by side with a dual axle 146, and each unmanned suspension frame 160 having a single steering rod 144 to maintain alignment between sets of wheels 52.

FIG. 12 A central chassis system 90 elongated from front to back with a front fixed mount 92 to a front lower suspension frame 10, maintaining alignment for a tilt shaft 4 and a front tilt shaft pinion 6.

FIG. 12 A central chassis system 90 elongated from front to back with a back fixed mount 94 to a back lower suspension frame 16, maintaining alignment for a tilt shaft 4 and a back tilt shaft pinion 8.

FIG. 12 A right and left pinion locking device manually activated in the form of a ratchet pawl 96 hinged mounted on a suspension frame 10 in a generally parallel axis to a spindle 70, each respective right and left ratchet pawl 96 can be forced engaged at the same time into both sides of the tilt shaft pinion 6 cogs.

A electro magnetic switch 98 in position to mechanically engage a ratchet pawl 96, into a segment of the respective tilt shaft pinion 6 cogs, to lock the tilted vehicle in a lateral lean position maintaining complete control of the vehicle in a turn with independent steering, FIG. 1 using a car type steering wheel 100, (shown in FIG. 1) or a motor cycle type handle bar 102 (shown in FIG. 3).

FIG. 9 A left strut assembly 104 operatively attached on a left lower control arm 62 with a left lower strut attachment point 106, and at the top of a suspension frame 10 having a left upper strut attachment point 108 just left of center of a cross member positioning means 110.

A right strut assembly 112 operatively attached on a right lower control arm 62 with a right lower strut attachment point 114, and at the top of a suspension frame 10 having a right upper strut attachment point 116 just right of center of a cross member positioning means 110.

FIG. 13 Countering out the opposing tilt on a lower suspension frame 10 generated from the lateral movement left from a lateral movable cross member 18.

FIG. 3 A suspension frame 10 and chassis 90 that stays generally parallel to the ground when transversing a hillside.

FIG. 14 A right upper counter strut king pin 118 fixed mounted on the top of a right upper tubular joint 42.

A left lower counter strut king pin 120 fixed mounted on the bottom of a suspension frame 10.

A right strut 122 pivotally mounted from the respective right upper counter strut king pin 118 to the respective left lower counter strut king pin 120.

FIG. 13 A lateral movable cross member 18 moves laterally to the left forcing the respective right strut 122 to counter out the opposing tilt of a lower suspension frame 10.

FIG. 8 Countering out the opposing tilt on a lower suspension frame 10 generated from the lateral movement right from the lateral movable cross member 18.

FIG. 14 A left upper counter strut king pin 124 fixed mounted on the top of a left upper tubular joint 42.

A right lower counter strut king pin 126 fixed mounted on the bottom of a suspension frame 10.

A left strut 128 pivotally mounted from the respective left upper counter strut king pin 124 to the respective right lower counter strut king pin 126.

FIG. 8 A lateral movable cross member 18 moves laterally to the right forcing the respective strut 128 to counter out the opposing tilt of a lower suspension frame 10.

A series of sprockets and chains could be configured to a tilt shaft with pinions, for controlling a lateral movable cross member, could even have the sprocket diameters calculated to time out lateral tilt, controlled manually or mechanically.

A series of pulleys, belts, or cables could be configured to a tilt shaft with pinions for controlling a lateral movable cross member, could even have the pulley diameters calculated to time out lateral tilt, controlled manually or mechanically.

Although the upper and lower control arms are shown as simple beams, for the purpose of illustration, they could also be configured as A-frames having dual upper and lower attachment points to provide additional fore and aft stability to the suspension assemblies, this could include dual front suspension frames with dual front pinions and dual front lateral movable cross members.

The chassis and suspension system may also include other struts, stabilizer bars, and drive or steering components, of a type commonly known in the art, and the same could be said for the rear chassis system and all its components.

Four wheel drive, four wheel steering, and four wheel, and passenger compartment lateral lean is easily accomplished on this; a manual, a mechanical, and a forced mechanical lateral leaning vehicle.

Although particular embodiments of the present invention have been described in the foregoing detailed description, it will be understood that the invention is capable of numerous rearrangements, modifications, and substitutions of parts without departing from the scope of the invention as set forth in the claims below.

BACKGROUND OF THE INVENTION

The present invention relates generally to systems for driving, steering, and leaning a three or four wheel vehicle. Prior art shows that inventions that lean all four wheels have a direct connection to the steering wheel and/or leaning apparatus.

My invention is equipped with an independent steering apparatus, steering wheel or handlebar.

My invention is equipped with an independent lateral leaning apparatus with weight transfer on a passenger compartment or a mechanically assisted lateral lean, in the turn or on a hill.

My invention shows the ability to drive all four wheels in the most extreme leaning situations including sharp turns, or steep hillsides, whereas other inventions show a limited leaning capability with no obvious telescopic drive shaft to drive any of the four wheels mounted on the tilting suspension.

Driving a leaning vehicle with three wheels would be easily accomplished with a single wheel in the back or front, like a motor cycle.

My invention however, shows all four wheels being driven with a telescopic CV slide shaft combined with a dog bone for clearance with little or no limitations to its max lateral leaning ability.

Some inventions have tilting bodies which give the passengers the feel of a motor cycle in a turn, this puts the passenger in a deceiving situation due to the stationary upright tires being in an unnatural position in a turn instead of sliding these vehicles would have a tendency to flip.

All leaning vehicles in a fast turn can experience what's known in the motor cycle racing world as a high side, whereas the leaning vehicle starts to slide in the turn and abruptly stops sliding, which whips the person in the opposite direction of the turn.

On my invention if there were tires sliding in the leaned turn, a driver could push a button mounted on the steering wheel or handle bar that would engage a pinion locking device, similar to a ratchet pawl mounted on the frame to lock the lateral leaning vehicle in place, while maintaining complete control of the vehicle in the turn with a steering wheel or a handle bar.

My invention has a frame on the suspension that maintains level to the ground independent from the passenger compartment and wheel lateral lean, this would maintain the suspension frame, central chassis, and the body level to the ground, eliminating the opposing tilt associated with any extreme lateral leaning vehicles.

The body could then be constructed with a lower profile, meaning a safer turn and a lot less top heavy for high speed turns or transversing a hillside.

What is claimed is:

1. A four wheel drive vehicle with mechanical controlled wheel and passenger compartment lateral lean having an elongated passenger compartment on a tilt shaft from front to back, and independent steering, comprising:

a tilt shaft with a fixed mount to a passenger compartment, each end of said tilt shaft having a pivot mount to a front and back tilt shaft pinion; having a tilt shaft pinion rotatively mounted on a front suspension frame for rotation about a transverse axis from said tilt shaft; and a front and back motor pinion rotatively mounted on said front suspension frame and a back suspension frame in a generally ten o'clock position transversely from each end of said tilt shaft in a gear mesh relationship with said front tilt shaft pinion and a back tilt shaft pinion controlling a front lateral movable cross member, in conjunction with a back lateral movable cross member, using a forced mechanism for lateral lean control; and a front and back electric DC servo gear motor having a fixed mount to said front and back suspension frame and controlled in conjunction with each other using a passenger forced mechanical control unit; and said front and back motor pinion rotatively mounted on said front and back suspension frame in a generally ten o'clock position transversely from each end of said tilt shaft in a gear mesh relationship with said front and back tilt shaft pinion controlling said front lateral movable cross member, independently from said back lateral movable cross member, using individual mechanisms for mechanical lateral lean control; and said front and back electric DC servo gear motor having a fixed mount to said front and back suspension frame, controlled with a front and back pendulum and hanging from said front and back mechanical control box mounted directly to the back of said front and back electric DC servo gear motor controlling said front lateral movable cross member independently from said back lateral movable cross member; and said lateral movable cross member and a rack combined in a gear mesh relationship on the top of said tilt shaft pinion; and a roller bearing guide having a fixed mount to the top of said suspension frame with a roller bearing relationship to the top of said lateral movable cross member for locating and aligning on the top of said tilt shaft pinion; and an upper control arm having an upper attachment point mounted in an articulated fashion to the outer ends of lateral movable cross member; and an upper tubular joint having a upper attachment point mounted in an articulated fashion to the outer end of said upper control arm; and a king pin having a fixed mount on said upper tubular joint transversely from said front lateral movable cross member with the outer end of said king pin pointing to the back of the vehicle; and a steering support bar with a pivot hole at an end to be pivotally mounted to said king pin, having a transverse axis from said tilt shaft; and a tilt support bar having a pivot hole at each end to be pivotally mounted to said king pin and having the inner end of said tilt support bar pivotally mounted to a passenger compartment king pin with a slot mount on said passenger compartment having leveling springs mounted inside said slot mount; and said passenger compartment king pin, a slot mounted on the front of said passenger compartment having an outer end of the respective passenger compartment king pin pointing to the front of the vehicle with the same axis as said passenger compartment, to be accepted in a pivot hole on an inner end of said tilt support bar; and a lower control arm having a lower attachment point mounted in a articulated fashion to the outer ends of a said lower suspension frame; and a lower tubular joint having a lower attachment point mounted in a in an articulated fashion to an outer end of said lower control arm; and said upper and lower tubular joint, each having a vertical pivot mount for a spindle; and the respective spindle having a top fixed mount to a steering knuckle with a generally transverse axis from said lateral movable cross member with the outer end of the respective steering knuckle pointing to the back of the vehicle while an outer end of said steering knuckle having a pivotal ball joint mount to a steering rod and pivotally mounted at an opposite inner end of the respective steering rod;

a ball joint fixed mounted to a pitman arm having a transverse axis from said lateral movable cross member with the outer end of said ball joint pointing to the front of the vehicle; and said axle having a generally transverse axis from said tilt shaft passing through the center of said spindle having a fixed mount to a universal joint, located on the outer end of a CV slide shaft which has;

a passage on the inner end for receiving a telescopically mounted outer end of a dog bone shaft, and also having a generally transverse axis from said tilt shaft with two slot pins fixed mounted on the outer end of said dog bone shaft for receiving said telescopic slot mount on the inner end of said CV slide shaft; and said dog bone shaft having a universal mount to a differential with a generally transverse axis from said tilt shaft; and a differential having one of a fixed mount and a limited pivot mount to said lower suspension frame to stay in line with said universal mount located on the inner end of said dog bone shaft; and an internal combustion motor having a fixed mount to said passenger compartment with a motor drive sprocket and a roller drive chain to;

a lower differential sprocket having a fixed mount to the center drive joint of a middle differential, with a roller chain relationship to said roller drive chain; and a middle differential having a fixed mount to the bottom of said tilt shaft, generally centered from the front and back of the vehicle in a transverse axis from a front and back differential; and a front and back drive dog bone shaft having a universal mount to the front and back universal mounts of said middle differential, with the same general axis as said tilt shaft; and a CV drive slide shaft, having a passage on the inner end for receiving a telescopically mounted outer end of said drive dog bone shaft, with the same general axis as said tilt shaft; and said front and back differential having a universal center drive mount to an outer end of said CV drive slide shaft;

a plurality of these suspensions assembled together side by side with dual axles, and each said suspension frame having a single said steering rod to maintain alignment between sets of said wheels; and a central chassis system elongated from front to back with a front fixed mount to a front lower suspension frame maintaining alignment for said tilt shaft and said front tilt shaft pinion; and said central chassis system elongated from front to back with a back fixed mount to said back lower suspension frame maintaining alignment for said tilt shaft and said back tilt shaft pinion; and a right and left pinion locking device manually activated in the form of a ratchet pawl hinged mounted on said suspension frame in a generally parallel axis to said spindle, each said right and left ratchet pawl are forced engaged at the same time into both sides of till shaft pinion cogs; and an electro magnetic switch in position to mechanically engage said ratchet pawl into a segment of said tilt shaft pinion cogs to lock the tilted vehicle in a lateral lean position; and a left strut assembly operatively attached on said left lower control arm with a left lower strut attachment point, and at the top of said suspension frame having a left upper strut attachment point just left of center of a cross member positioning means; and a right strut assembly operatively attached on said right lower control arm with a right lower strut attachment point, and at the top of said suspension frame having a right upper strut attachment point just right of center of said cross member positioning means.

2. A four wheel drive vehicle with manual controlled wheel and passenger compartment lateral lean having an elongated passenger compartment on a tilt shaft from front to back, and independent steering, comprising:

a tilt shaft with a fixed mount to a passenger compartment, each end of said tilt shaft having a fixed mount to a front and back tilt shaft pinion; and said tilt shaft pinion rotatively mounted on a suspension frame for rotation about a transverse axis from said tilt shaft; and a front to back middle pinion rotatively mounted on a front suspension frame and a back suspension frame in a gear mesh relationship on the top of said front and back tilt shaft pinion, for rotation about a transverse axis from said tilt shaft; and a front and back top pinion rotatively mounted on said front and back suspension frame in a gear mesh relationship on the top of said front to back middle pinion, for rotation about a transverse axis from said tilt shaft; and a lateral movable cross member and a rack combined in a gear mesh relationship on the top of said tilt shaft pinion; and a roller bearing guide having a fixed mount to the top of said suspension frame with a roller bearing relationship to the top of said lateral movable cross member for locating and aligning on the top of said tilt shaft pinion; and an upper control arm having an upper attachment point mounted in an articulated fashion to the outer ends of said lateral movable cross member; and an upper tubular joint having an upper attachment point mounted in an articulated fashion to the outer end of said upper control arm; and a king pin having a fixed mount on said upper tubular joint transversely from said front lateral movable cross member with an outer end of said king pin pointing to the back of the vehicle; and a steering support bar with a pivot hole at an end to be pivotally mounted to said king pin, having a transverse axis from said tilt shaft; and a lower control arm having a lower attachment point mounted in a articulated fashion to outer ends of a lower suspension frame; and a lower tubular joint having a lower attachment point mounted in a in an articulated fashion to the outer end of said lower control arm; and said upper and lower tubular joint, each having a vertical pivot mount for a spindle; and the respective spindle having a top fixed mount to a steering knuckle with a generally transverse axis from said lateral movable cross member with the outer end of the respective steering knuckle pointing to the back of the vehicle while the outer end of said steering knuckle having a pivotal ball joint mount to a steering rod and pivotally mounted at the opposite inner end of the respective steering rod; and a ball joint fixed mounted to a pitman arm having a transverse axis from said lateral movable cross member with the outer end of said ball joint pointing to the front of the vehicle; and an axle having a generally transverse axis from said tilt shaft passing through the center of said spindle having a fixed mount to a universal joint, located on an outer end of a CV slide shaft which has;

a passage on an inner end for receiving a telescopically mounted outer end of a dog bone shaft, and also having a generally transverse axis from said tilt shaft with two slot pins fixed mounted on the outer end of said dog bone shaft for receiving said telescopic slot mount on the inner end of said CV slide shaft; and said dog bone shaft having a universal mount to a differential with a generally transverse axis from said tilt shaft; and a differential having a generally limited pivot mount to said lower suspension frame to stay in line with said universal mount located on the inner end of said dog bone shaft; and an internal combustion motor having a fixed mount to said passenger compartment with a motor drive sprocket and a roller drive chain to a lower differential sprocket having a fixed mount to the center drive joint of a middle differential, with a roller chain relationship to said roller drive chain; and a middle differential having a fixed mount to the bottom of said tilt shaft, generally centered from the front and back of the vehicle in a transverse axis from a front and back differential; and a front and back drive dog bone shaft having a universal mount to the front and back universal mounts of said middle differential, with the same general axis as said tilt shaft; and a CV drive slide shaft, having a passage on the inner end for receiving a telescopically mounted outer end of said drive dog bone shaft, with the same general axis as said tilt shaft; and said front and back differential having a universal center drive mount to the outer end of said CV drive slide shaft;

a plurality of these suspensions assembled together side by side with dual axles, and each said suspension frame having a single said steering rod to maintain alignment between sets of said wheels; and a central chassis system elongated from front to back with a front fixed mount to a front lower suspension frame maintaining alignment for said tilt shaft and said front tilt shaft pinion; and said central chassis system elongated from front to back with a back fixed mount to said back lower suspension frame maintaining alignment for said tilt shaft and said back tilt shaft pinion; and a right and left pinion locking device manually activated in the form of a ratchet pawl hinged mounted on said suspension frame in a generally parallel axis to said spindle, each said right and left ratchet pawl are forced engaged at the same time into both sides of tilt shaft pinion cogs; and an electro magnetic switch in position to mechanically engage said ratchet pawl into a segment of said tilt shaft pinion cogs to lock the tilted vehicle in a lateral lean position; and a left strut assembly operatively attached on said left lower control arm with a left lower strut attachment point, and at the top of said suspension frame having a left upper strut attachment point just left of center of a cross member positioning means; and a right strut assembly operatively attached on said right lower control arm with a right lower strut attachment point, and at the top of said suspension frame having a right upper strut attachment point just right of center of said cross member positioning means.

3. A four wheel drive vehicle with mechanical and manual controlled wheel and passenger compartment lateral lean having an elongated passenger compartment on a tilt shaft from front to back, and independent steering, countering out the opposing tilt of a lower suspension frame, comprising:

a suspension frame and chassis that stays generally parallel to the ground it is transversing; and a right upper counter strut king pin fixed mounted on the top of a right upper tubular joint; and a left lower counter strut king pin fixed mounted on the bottom of said suspension frame; and a right strut pivotally mounted from said right upper counter strut king pin to said left lower counter strut king pin; and a front lateral movable cross member moves laterally to the left forcing said right strut to generally counter out the opposing tilt of said lower suspension frame; and a left upper counter strut king pin fixed mounted on the top of a left upper tubular joint; and a right lower counter strut king pin fixed mounted on the bottom of said suspension frame; and a left strut pivotally mounted from said left upper counter strut king pin to said right lower counter strut king pin; and a front lateral movable cross member moves laterally to the right forcing said left strut to generally counter out the opposing tilt of said lower suspension frame.

* * * * *